United States Patent
Hogan et al.

(12)

(10) Patent No.: US 6,194,485 B1
(45) Date of Patent: Feb. 27, 2001

(54) COMPOUNDING PROCESS FOR ACHIEVING UNIFORM, FINE PARTICLE SIZE DISPERSION OF CURING AGENTS WITH MINIMAL USE OF SOLVENTS

(75) Inventors: Terrence E. Hogan, Cuyahoga Falls; Xiaorong Wang, Akron; William L. Hergenrother, Akron; Georg G. A. Bohm, Akron, all of OH (US)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/285,198

(22) Filed: Apr. 1, 1999

(51) Int. Cl.⁷ .............................. B29C 73/00; C08K 5/15
(52) U.S. Cl. ............................................ 523/166; 524/113
(58) Field of Search .............................. 523/166; 542/113

(56) References Cited

U.S. PATENT DOCUMENTS

| | | |
|---|---|---|
| 2,765,018 | 10/1956 | Connell . |
| 3,981,342 | 9/1976 | Farber et al. . |
| 4,064,922 | 12/1977 | Farber et al. . |
| 4,116,895 | 9/1978 | Kageyama et al. . |
| 4,256,158 | 3/1981 | Chautard et al. . |
| 4,426,468 | 1/1984 | Ornum et al. . |
| 4,616,048 | 10/1986 | DeTrano et al. . |
| 4,913,209 | 4/1990 | Hong et al. . |
| 4,966,213 | 10/1990 | Kawaguchi et al. . |
| 5,085,942 | 2/1992 | Hong et al. . |
| 5,128,392 | 7/1992 | DeTrano et al. . |
| 5,295,525 | 3/1994 | Sanda, Jr. . |

FOREIGN PATENT DOCUMENTS

WO 99/47343    9/1999    (WO) .

*Primary Examiner*—Kriellion Sanders
(74) *Attorney, Agent, or Firm*—David G. Burleson; Scott McCollister

(57) ABSTRACT

Rubber curing agents such as quinoids are compounded to achieve a uniform or homogeneous distribution thereof in a rubber composition. The quinoid curing agents are initially solubilized in an organic polar solvent and then mixed with the rubber or rubber masterbatch. The organic polar solvent is then removed. A uniform fine distribution of the curing agent results in improved physical properties. The process is an improvement in that it does not require the rubber masterbatch be dissolved in a nonpolar solvent. The present invention is particularly suitable as a sealant composition for tires.

22 Claims, No Drawings

COMPOUNDING PROCESS FOR ACHIEVING UNIFORM, FINE PARTICLE SIZE DISPERSION OF CURING AGENTS WITH MINIMAL USE OF SOLVENTS

FIELD OF INVENTION

The present invention relates to compounding of quinoid curing agents. More specifically, the present invention relates to predissolving the curing agent in an organic polar solvent with subsequent mixing and precipitation of the curing agent within a dry rubber blend. The resulting blend is an "A" component for various applications. A preferred application is a sealant for tubeless pneumatic tires to seal punctures resulting from road debris such as nails.

BACKGROUND OF THE INVENTION

While there are many patents on sealant compositions for pneumatic tires, three patents: U.S. Pat. Nos. 4,116,895; 4,426,468; and 4,616,048 provide basic information on the field. An often used curative for the sealant compositions is a quinoid type system, which generally comprises a quinoid and a crosslinking activator. The quinoids and their activators are set forth in U.S. Pat. No. 4,426,468 ('468 column 5, line 28, through column 6, line 5). In U.S. Pat. No. 4,616,048 ('048) the crosslinking activator of the '468 patent is described as a cocuring agent "B" and the concept of a optional polar solvent accelerator is introduced (column 5, line 33, through column 6, line 8). The '468 patent in column 5, lines 28–29, explains the quinoid cure system depends on crosslinking through nitroso groups.

In U.S. Pat. No. 4,116,895 ('895) column 6, lines 4–13, the author explains that if the amount of crosslinking is too low the sealing properties at high temperature are ineffective while a crosslink density that is too high also prevents the sealant from functioning.

In the '468 patent column 2, line 32, through column 3, line 18, the author explains that tire sealants benefit from the optimization of three properties: tensile strength, elongation, and crosslink density. The examples of the '468 patent illustrate how the three properties can be correlated with various aspects of tire sealant performance. In the '468 patent the quinoid is diluted in cyclohexanone and then added to a butyl rubber and Piccotac component which have been premixed in hexane at about 50 wt. % solids.

The '048 patent teaches a method of dispersing quinoid curing agents in a rubber composition that results in a uniform fine dispersion of the quinoid. In the examples of the '048 patent (column 7, line 49, through column 8, line 20) the quinoid was made up as a 5 wt. % solution with surfactants in tetrahydrofuran, which was then mixed with a majority of the rubbers predissolved in hexane. This is consistent with the Detailed Description (column 4, line 31, through column 5, line 6) where the addition of the quinoid as a dissolved solution during mixing of the rubber in solvent results in the precipitation of the quinoid curative as a fine dispersion. Column 5, lines 39–42, specify that the solvent for the quinoid not only has to be a reasonably good solvent for the quinoid but it must be compatible with the masterbatch solvents in the rubber cement. Table II of the '048 patent illustrates the "solution method" increases the maximum torque of samples over samples prepared by the "conventional mixing" and decreases the time to reach maximum torque. These results imply the quinoid is more effective as a curative when finely dispersed. In Table IIIA the "solution method" results in lower swell ratios and higher solvent clarity which implicates more effective and uniform crosslinking. In Table IIIB the "solution method" resulted in enhanced solvent clarity and less microgel indicating more uniform crosslinking.

SUMMARY OF THE INVENTION

Accordingly, it is an aspect of the present invention to provide an improved method of dispersing quinoid curing agents in a rubber composition, which method eliminates the use of nonpolar organic solvents to dissolve the rubbers. The elimination of nonpolar organic solvents eliminates the costly step of removing the nonpolar organic solvents from the final product. Further, the improved method only uses and recovers a single polar organic solvent while the method of the U.S. Pat. No. 4,616,048 recovered a blend of polar and nonpolar solvents which was difficult to separate and recycle.

It is yet another aspect of the present invention to disperse quinoid curing agents in a rubber composition, as above, whereby a uniform fine distribution is obtained.

It is a still further aspect of the present invention to disperse quinoid curing agents in a rubber composition, as above, so that a balanced combination of properties including tackiness, resiliency, compliance and cohesive strength essential for maximum sealing effectiveness is achieved.

These and other aspects of the present invention will become apparent from the following specification, which describes in detail the invention.

In general, the process for solution compounding a quinoid curing agent for a sealant composition, comprises the steps of:

(a) adding at least one quinoid curing agent to a solubilizing organic polar solvent and forming a solution, (b) adding said quinoid curing agent solution to a rubber blend, and mixing and precipitating said curing agent in said blend forming a mixture so that a uniform fine dispersion of said curing agent is formed, and (c) removing said organic polar solvent of said mixture to form a dry sealant component wherein the number average particle size of said dispersed quinoid curing agent is less than 10 microns and said rubber blend includes less than 10 wt. % of nonpolar solvents when said quinoid curing agent is added.

DETAILED DESCRIPTION OF THE INVENTION

According to the present invention, quinoid curing agents are readily and uniformly dispersed in rubber compositions, especially the rubber mixtures typically called the "A" component. The method is an improvement over the prior art as it achieves a uniform dispersion of small quinoid particles without the use of nonpolar organic solvents previously used to reduce the viscosity of the rubbers. Moreover, the present invention also relates to the use of peroxide cocuratives typically in the "B" component. The addition of the A and B components results in a composition that will readily cure at temperatures from about 15° C. to about 150° C. and thereafter the crosslink density will not significantly increase or decrease even though exposed to air and/or elevated temperatures.

The rubber or the sealant rubber compounds of the present invention generally contains at least one high molecular weight elastomer(s) as well as at least one liquid elastomeric type tackifiers. Typically, the high molecular weight elastomer(s) which can be utilized in the present invention include ethylene-propylene-diene terpolymers (EPDM), polybutadiene, partially hydrogenated polybutadiene, butyl rubber, halo butyl rubber for example chloro- or bromo-, acrylonitrile-butadiene copolymer, styrene butadiene copolymer, natural rubber, or cis polyisoprene and the like. Mixtures of two or more of the above elastomers can also be used, as can various other conventional high molecular weight rubbers. The number average molecular weight of said high molecular weight elastomer is at least about 50,000 and desirably at least about 100,000. The terms elastomer and rubber will be used interchangeably in this specification. This is especially true when specifying other components based on 100 parts by weight of rubber (phr).

The tackifiers utilized in the present invention are rubbery polymers of relatively low molecular weight, for example, those having a number average molecular weight of about 500 to about 5,000 and which often are liquids at room temperature (that is about 20° C. to about 25° C.). These will be considered as a rubber along with the high molecular weight elastomer.

Many structural types of low molecular weight polymers in liquid form are useful including ethylene-propylene copolymer (EP), ethylene-propylene-diene terpolymer (EPDM), polybutadiene (PBD), hydrogenated PBD, butyl rubber (BR), polypropylene (e.g. atactic), acrylonitrile-butadiene copolymer (ANB), styrene-butadiene copolymer (SBR), synthetic polyterpenes, thermoplastic olefins, pentaerythritol esters of hydrogenated rosins, triethylene glycol esters of hydrogenated rosins, vinyl toluene copolymers, alkyl aromatics, coumarone-indenes, depolymerized natural rubber (DPR) and polybutenes. Because of their cost, availability and properties the polybutenes are particularly useful.

Such polybutenes preferably have a number average molecular weight exceeding about 1000 as this has an effect on minimizing the possibility of migration into adjacent tire components. It is preferably prepared by polymerizing an isobutylene rich stream with a metal halide catalyst and preferably has a polymer backbone structure resembling polyisobutylene. Very suitable polybutenes are available under the trademark Indopol, e.g. Indopol H-300 and Indopol H-1900, from Amoco. The manufacturer indicates that these Indopols have a polymer backbone structure resembling isobutylene and that the Indopol H-300 and Indopol H-1900 have viscosities ranging from about 627–675, to about 4069–4382 centistokes, respectively at 210° F. (STM D-445). The number average molecular weights (Mn) of the same materials is respectively from about 1290 to about 2300, as determined by vapor pressure osmometry. In addition to the above commercially available tackifiers, an aliphatic type tackifier can be utilized such as Piccotac B-BHT which is manufactured by Hercules.

Generally, from about 55 to about 90 percent by weight of the sealant rubber compound of the present invention are the tackifiers with from about 65 or 75 percent to about 90 percent being preferred. The amount of the high molecular weight rubber compounds accordingly is from about 10 percent to about 45 percent by weight with from about 10 percent to about 25 or 35 percent being preferred. Said weights being based on the total weight of the high and low molecular weight rubbers.

In this method the high molecular weight elastomer(s) and the low molecular weight polymers do not need to be predissolved in a nonpolar solvent before the solution of quinoid curing agent is added. Therefore, the claims are limited to situations where less than 10, 5, 1, or 0.1 wt. % nonpolar solvent is present in the rubber blend when the quinoid curing agent is added. While the term nonpolar organic solvents is a commonly used and a well understood term, for the purposes of this application it shall include linear, branched and cyclic alkanes or alkenes of 4 to 30 carbon atoms, aromatics of 6 to 20 carbon atoms including naphthenic compounds, and other nonpolar hydrocarbon compounds of similar solubility parameter to the specified compounds.

The quinoid curing agents generally include any suitable quinonedioxime compound. The amount of the quinoid agent is generally utilized in an amount of from 0.1 to about 5.0 parts by weight per 100 parts by weight of the total dry component (dry sealant component or component A) as discussed hereinbelow. A desirable amount is from 0.2 to about 2.0 with a preferred amount being from 0.3 to about 1.0 parts by weight per 100 parts of said dry sealant component. Suitable quinoid compounds include p-quinonedioxime, p-quinone dioxime diacetate, p-quinone dioxime dicaproate, p-quinone dioxime di-laurate, p-quinone dioxime distearate, p-quinone dioxime dicrotonate, p-quinone dioxime dinaphthenate, p-quinone dioxime succinate, p-quinone dioxime adipate, p-quinone dioxime difuroate, p-quinone dioxime dibenzoate, p-quinone dioxime di(o-chlorobenzoate), p-quinone dioxime di-(p-chloro benzoate), p-quinone dioxime di-(p-nitro benzoate), p-quinone dioxime di-(m-nitro benzoate), p-quinonone dioxime di(3,5 dinitro benzoate), p-quinone dioxime di(p-methoxy benzoate), p-quinone dioxime di(n-amyl oxy benzoate), p-quinone dioxime di(m-bromo benzoate), p-quinone dioxime di-(phenyl acetate), p-quinone dioxime di-cinnamate, p-quinone dioxime di-(N-phenyl carbamate), bis ethoxy methyl ether of quinone dioxime, mono-zinc salt of quinone dioxime, di-zinc salt of quinone dioxime, zinc chloride double salt of quinone dioxime, mono mercury salt of quinone dioxime, dimercuric salt of quinone dioxime, mercuric chloride double salt of quinone dioxime, mono-barium chloride double salt of quinone 20 dioxime, mono-cupric salt of quinone dioxime, mono-lead salt of quinone dioxime, mono-barium salt of quinone dioxime, mono-magnesium salt of quinone dioxime, mono-calcium salt of quinone dioxime, silver salt of p-quinone dioxime, 1,4-naphthoquinone dioxime, chloro methyl quinone dioxime, 2,6-dimethyl 1,4-quinone dioxime, 2-phenyl-1,4-quinone dioxime, thymo quinone dioxime, 2-chlor-p-quinone dioxime, thymo quinone dioxime dibenzoate, thymo quinone dioxime diacetate, p-quinone dioxime phosphochloride, and the like, and mixtures thereof. A preferred quinoid compound is p-benzoquinone dioxime.

The dry components of the sealant composition comprises all of the component "A" other than the polar organic solvent which is removed by evaporation as part of the preparation. Desirably the dry component includes less than 5 wt. % total solvents (polar and nonpolar) and preferably less than 1 wt. % based on the total weight of the dry component.

Preparation of a sealant composition of the present invention is generally as follows: Initially, a mixed rubber masterbatch is prepared. The sealant generally contains the high molecular weight elastomer(s) such as EPDM and a portion of the various low molecular weight tackifiers. The sealant also usually contains a reinforcing agent such as carbon black or other suitable agents as set forth hereinbelow. The sealant is desirably mixed in a high shear mixer such as a sigma blade kneader extruder, Brabender Plastograph™, other extruder (e.g. twin-screw) etc.

A quinoid curing agent(s), which is dissolved in an organic polar solvent as described more fully hereinbelow, is added to the mixer usually with slight heat, under agitation, and optionally under vacuum so as to disperse and precipitate the quinoid as very fine particles in the rubber. The above mixture of materials generally is referred to as a rubber mixture or blend. The rubber blend is then desolventized as set forth more fully hereinbelow as by heating and/or applying a vacuum thereto to remove the volatile polar solvent(s). The desolventized solution is generally referred to as the "dry sealant component" or component "A". The dry sealant component can be stored in any suitable manner until required.

According to the present invention, the quinoid compound is dissolved in a suitable organic polar solvent (solubilizing solvent) before being added to the rubber or rubber masterbatch. The amount of solubilizing solvent is such that the quinoid compound is soluble therein. Generally, the amount of quinoid is up to but less than a saturated solution, and usually up to 10 percent by weight of the organic polar solvent (that is, based upon 100 parts by weight of said solvent) and generally 1 percent or more. The solvent must readily dissolve the quinoid curing agent to a reasonable concentration. Optionally any quinoid compound that doesn't dissolve may be removed by a process such as filtration. Examples of suitable quinoid solubilizing solvents include cyclohexanone, furan, dioxane, dioxolane, N-methyl pyrrolidone, dimethylsulfoxide (DMSO); dimethylformamide, ethanol, isopropanol, acetone, methylethyl ketone, and tetrahydrofuran, and the like. A preferred solvent is tetrahydrofuran. Most of these solvents are volatile so that they can be stripped off as with heat and/or vacuum.

The quinoid curing agent solubilized in the organic polar solvent is then charged or added to the above noted masterbatch blend to form the rubber blend, preferably under high shear mixing or agitation. The addition of the quinoid solution is carried out in a manner such that a very fine dispersion of the quinoid is precipitated into the rubber mixture during mixing. The precipitated quinoid curing agents should have a number average particle size of less than 15 microns, desirably less than 10 microns and preferably less than 5 microns. It is important that the solubilized quinoid be thoroughly mixed with the rubber so that a uniform or homogeneous distribution thereof is obtained. It is desirable that the method of quinoid addition to the rubber quickly transports the precipitated quinoid away from the addition site for additional quinoid solution so that the size of the quinoid crystals do not grow appreciably during quinoid addition to the rubber. One effective way is to add the quinoid solution as a fine spray or stream to an actively mixed rubber near a high shear point for the rubber. Although any number of techniques can be utilized to charge the solubilized quinoid curing agent to the rubber cement, care should be taken with regard to the rate of addition of the quinoid solution in accordance with the mixing equipment being used so as to avoid premature precipitation of the quinoid compound. Generally, mixing occurs at a temperature of from about 20° C. to about 135 or 150° C. and preferably at a temperature of from about 25° C. to about 100 or 135° C.

Additionally, other ingredients which can be utilized to prepare the rubber blend include various reinforcing agents. A suitable agent includes finely divided carbon such as carbon black. Other suitable reinforcing agents include zinc oxide, aluminum hydrate, lithopone, whiting, clays, hydrated silicas, calcium silicates, silicoaluminates, magnesium oxide, and magnesium carbonate. The amount of such reinforcing agents is from about 0.1 to about 50 parts, and desirably from about 1 to about 20 parts by weight per 100 parts by weight of said dry sealant component.

Another desirable ingredient is a surfactant. It is preferred but not required that the surfactant be blended with the quinoid and the polar organic solvent solution before they are added to the rubber. It is thought that the surfactant stabilizes the growth of small quinoid particles. Generally, any suitable surfactant can be utilized such as lecithin. The amount of the surfactant is from 0.001 to about 2 percent by weight based upon the total weight of said dry sealant component. Other surfactants include conventional anionic as well as nonionic surfactants such as various carboxylic acid salts, such as common soap; naphthenates; various sulfuric esters such as alkyl sulfates; sulfated oils; various ether sulfates, such as sodium poly(ethylene-oxide)-sulfate; various sulfonates such as alkyl and alkyl-aryl sulfonates; various phosphates and phosphonates such as alkyl phosphates and alkyl phosphonates; various ethers; various esters and various amides.

A "B" cocuring agent component or peroxide component is generally prepared as follows: After the cocuring agent is added to the "A" blend, the quinoid curing system is more sensitive to heat and premature crosslinking. The desired peroxides as set forth hereinbelow, if they are solids at room temperature, usually have a number average particle size of less than 15 microns, desirably less than 10 microns and preferably less than 5 microns. Such fine particle peroxides are added to a vessel. A low molecular weight tackifier, as set forth above, is also added and generally serves as a carrier for the various ingredients. The amount of tackifier generally ranges from about 20 parts to about 50 parts by weight based upon the total amount of weight of said "B" component.

Another optional component, which can be added to the "B" component, is polar solvent accelerators which are utilized in the amount of from about 0.0 or 0.1 to about 20 and desirably about 0.5 to about 15 parts by weight per 100 parts by weight of the "B" component. Alternatively these can be added to or present in the "A" component. In the present invention, it is preferred that the peroxide curing compounds be either predispersed in the polar solvent accelerator prior to incorporation into the "B" component or sequentially or jointly added thereto. Suitable polar solvent accelerators include water, primary, secondary and tertiary alcohols and polyols such as aliphatic, cycloaliphatic and aromatic alcohols containing from 1 to 12 carbon atoms as for example methanol, ethanol, propanol, butanol, n-octanol, n-heptanol, n-hexanol, iso-octanol, 2,2-dimethyl-hexane-6-ol, t-amyl alcohol, 4-methyl cyclohexanol, benzyl alcohol, butanediol, propylene glycol and ethylene glycol; ketones, such as ethyl methyl ketone and cyclohexanone; aldehydes such as benzaldehyde, acetaldehyde and propionaldehyde; ethers such as tetrahydrofuran, dioxane, dioxalane and diethyl ether; alkyl and aromatic nitrites such as propionitrile and benzonitrile; acids such as phosphoric acid, acetic acid and propionic acid; aqueous bases such as NaOH; and esters such as dimethyl succinate and diethyl succinate. Dipolar, aprotic compounds such as dialkyl formamides, dialkyl acetamides and dialkylsulfoxides such as dimethylsufoxide are also useful. Mixtures of these accelerators can be utilized. The above polar accelerators can also serve to modify viscosity. Various compounds are mixed together with a sufficient amount of tackifier therein so that component "B" has a viscosity such that it is readily mixed with the "A" component.

Mixtures of the "A" component and the "B" component are accomplished in any suitable mixing device with the requirement that once these compounds are mixed together they are soon thereafter applied to the end product. The application time after mixing the A & B components is typically 0.1–30 minutes more desirably 0.1–10 and preferably 0.1–5 minutes at a temperature from about 25 to about 130° C. Generally, an extruder is utilized such that the sealant composition is mixed and then is directly applied to the inner portion of a pneumatic tire in a very short period of time.

Referring now to the "B" component, it contains an organic peroxide cocurative. A nonexclusive list of organic peroxides include benzoyl peroxide; t-butyl peroxypivalate; 2,4-dichloro-benzoyl peroxide; decanoylperoxide; propionyl peroxide; hydroxyheptyl peroxide; cyclohexanone peroxide; 2,5-dimethylhexyl-2,5-di(peroxy-benzoate); t-butyl perbenzoate; dicumyl peroxide; 2,5-dimethyl-2,5-di(t-butylperoxy)hexyne-3; 2,5-di-methyl 2,5-di(t-butylperoxy) hexane; 3,5-dimethyl-2,5-di(benzoyl-peroxy)hexane; di-t-butyl peroxide; p-menthane hydro-peroxide; cumene hydroperoxide; 2,5-dimethyl-2,5-di(hydroperoxy)hexane; t-butyl hydroperoxide; lauroyl peroxide; t-amyl perbenzoate; or mixtures therof. Preferred organic peroxides are benzoyl peroxide and t-butyl perbenzoate. Mixtures of two or more of the above peroxides can also be used. Other useful peroxide curing agents are known to those skilled in the art.

It is usually desirable to support the peroxide cocuring agent on an inert filler carrier for reasons of safety and convenience in handling.

Typical materials which can be utilized as solid supports for the above-identified peroxide curing agents include corn starch, wheat starch bases, clay, and inorganic phosphate bases such as calcium phosphate, such materials should be of a very fine particle size.

Typical commercially available supported peroxides which may be utilized in the instant invention include: LUPERCO AA from Pennwalt Chemicals which contains approximately 33 percent benzoyl peroxide supported on a wheat starch base; and LUPERCO ACP from Pennwalt Chemicals which is approximately 35 percent benzoyl peroxide supported on an inorganic phosphate base. As is well known to those of skill in the art, peroxides such as those described above should be handled with the utmost care whether they are pure, supported on inert filler or combined with polymer. The tendency of peroxides to decompose or react violently requires the exercise of care and skill in their use and the skilled artisan will thoroughly familiarize himself with their properties before employing them.

The amount of peroxide utilized on a molar basis is generally in excess of the quinoid curing agent. Thus, from 0.5 to about 10.0 moles and preferably from about 1.0 to about 5.0 moles of a peroxide compound is utilized per mole of quinoid curing agent. Thus, from about 0.05 to about 10 parts, more desirably from about 0.1 to about 8 parts and preferably from about 0.3 to about 5 parts by weight of the peroxide is utilized per 100 parts by weight of the total sealant composition.

A sealant when made according to the compounding process of the present invention has the advantage of generally achieving a required balance of physical and rheological properties, essential for effective sealing performance. Moreover, since the curative as well as the cocuratives is uniformly and efficiently dispersed, the overall amount thereof utilized can be reduced resulting in lower sealant costs and excellent aging stability. Another advantage is that uniform consistency in reproducibility of the product results in greater process control during application of the sealant to the tire. In addition to tires, the sealant material can be utilized for caulking compounds, roofing adhesive and contact adhesive.

The application of the sealant material to the tire can occur in any conventional manner as by brushing, extrusion coating, and the like. Desirably, cement spraying is not utilized due to the problems and hazards created by the solvent vapors. Once applied to the tire or other article, the sealant can be cured. Curing can take place from ambient temperature, that is from about 15° C. to about 125 or 150° C. with from about 60° C. to about 100, 135 or 150° C. being preferred.

The invention will be better understood by reference to the following examples.

EXAMPLES

The following examples illustrate that the process of this disclosure can form a sealant with equivalent properties to the sealant preparation method of U.S. Pat. No. 4,616,048 without the use of hexane or another nonpolar solvent. U.S. Pat. No. 4,61 6,048 also illustrates the sealant properties that would result without the use of hexane and tetrahydrofuran. The hexane was a necessary component in U.S. Pat. No. 4,616,048.

Example 1

Preparation of Part A According to the Invention

To a 5L kneader-extruder (MXE-6, Jaygo Inc.) equipped with sigma blades was added 0.546 kg of EPDM (Royalene) at 108° C. Mixing was continued for 20 minutes over which time the temperature was raised to 130° C., and the EPDM became one mass. Carbon black (N326), 0.18 kg, was then introduced. After 30 minutes, a powder remained in the mixer and 0.395 kg of low molecular weight Indopol H-300 ((poly (isobutylene), Mn=1290, viscosity=627–675 centistokes at 210° F. (STM D-445)) was added. This was blended for 30 minutes at 130° C., and an additional 0.395kg Indopol H-300 was added. Mixing was continued for 75 minutes, and 0.885 kg of Indopol H-1900 (poly(isobutylene)), Mn=2300, viscosity=4069–4382 centistokes at 210° F. (STM D-445)) was introduced. To the kneader-extruder was then added an additional 0.885 kg of Indopol H-1900. After 75 minutes, the mixer temperature was set at 50° C. A solution of 0.01 75 kg benzoquinone dioxime, 0.192 kg Piccotac B-BHT, and 0.0175 kg lecithin dissolved in 0.450 kg tetrahydrofuran was filtered through a Whatman Qualitative medium fast filter paper and added to the mixer under a nitrogen purge venting into a dry ice trap. The filtering was to optimize the particle size (excluding nonsoluble particles) and additional benzoquinone dioxime was added to replace the nonsoluble portion. Tetrahydrofuran was removed over 25 minutes. The mixer was then heated to 110° C. and the batch extruded through a 0.25 inch die.

Example 2

Preparation of EPDM/Carbon Black Masterbatch

To a 300 g Brabender equipped with sigma blades was added 225.6 g of EPDM (Royalene). Mixing was started at 60 rpm and 110° C. After 30 seconds, carbon black (N326) was added. Mixing continued for a total of 5 minutes when the temperature reached 170° C. Product was then removed from Brabender.

Example 3

Preparation of Part A Using EPDM/Carbon Black Masterbatch

To a 5L kneader-extruder (MXE-6, Jaygo Inc.) equipped with sigma blades was added 0.726 kg of EPDMlcarbon black masterbatch (from example 2) at 94° C. and heated to 130° C. After 10 minutes, 0.395 kg of low molecular weight Indopol H-300 was added. This was blended for 30 minutes at 130° C., and an additional 0.395 kg Indopol H-300 was added. Mixing was continued for 110 minutes, and 0.885 kg of Indopol H-1900 was introduced. To the kneader-extruder was then added an additional 0.885 kg of Indopol H-1900. After 40 minutes, 0.192 kg of Piccotac B-BHT was added and blended for 25 minutes. The mixer temperature was then set at 50° C. A solution of 0.0175 kg benzoquinone dioxime and 0.0175 kg lecithin dissolved in 0.450 kg tetrahydrofuran was filtered through the Whatman paper (replacing any insoluble quinoid with soluble quinoid) and added to the mixer under a nitrogen purge vented into a dry ice trap. Tetrahydrofuran was removed over 40 minutes. The mixer was then heated to 110° C. and the batch extruded through a 0.25 inch die.

Example 4

Preparation of Part A with a Dispersion of Carbon Black in H-300

To a 5L kneader-extruder (MXE-6, Jaygo Inc.) equipped with sigma blades was added 0.546 kg of EPDM (Royalene) at 113° C. Mixing was continued for 30 minutes over which time the temperature was raised to 130° C., and the EPDM became one mass. Carbon black (N326) dispersed in H-300 (0.97 kg) was then introduced. After 205 minutes, 1.77 kg of Indopol H-1900 was added. This was blended for 55 minutes at 130° C., and 0.92 kg Piccotac B-BHT was introduced. After 5 minutes, the mixer temperature was set at 50° C. Twenty-five minutes later, a solution of 0.0175 kg benzoquinone dioxime and 0.0175 kg lecithin dissolved in 0.450 kg tetrahydrofuran was filtered through the Whatman paper, as previously described, and added to the mixer under a nitrogen purge venting into a dry ice trap. Tetrahydrofuran was removed over 30 minutes. The mixer was then heated to 110° C. for 30 minutes, and the batch extruded through a 0.25 inch die.

Example 5

Pregaration of Part A-Piccotac B-BHT Added as Solid Pellets According to the Invention To a 5L kneader-extruder (MXE-6, Jaygo Inc.) equipped with sigma blades was added 0.546 kg of EPDM (Royalene) at 80° C. Mixing was continued for 25 minutes over which time the temperature was raised to 130° C., and the EPDM became one mass. Carbon black (N326), 0.18 kg, was then introduced. After 30 minutes, a powder remained in the mixer and 0.79 kg of low molecular weight Indopol H-300 was added. Mixing was continued for 45 minutes, and 0.29 kg Piccotac B-BHT was introduced. After 10 minutes, 1.77 kg of Indopol H-1900 was added. Lecithin, 0.01 75 kg, was then added and the temperature set at 50° C. Twenty-five minutes later, a solution of 0.0175 kg benzoquinone dioxime dissolved in 0.360 kg tetrahydrofuran was filtered, as previously described, and added to the mixer under a nitrogen purge venting into a dry ice trap. Tetrahydrofuran was removed over 60 minutes. The mixer was then heated to 110° C. for 30 minutes and the batch extruded through a 0.25 inch die.

Example 6

PreDaration of Part A-Solution Synthesis

Part A was prepared as described in U.S. Pat. No. 4,616, 048 (column 7 row 53 to column 8 row 4; and more specifically the recipe of Table I, column B).

Example 7

Vulcanization of Tire Sealant

To a Brabender Plasticorder operating at 60 rpm and 65° C. was added 40.5 g of Example 1. After 3 minutes, the torque was measured, and 4.5 g of Part B made by the process described in U.S. Pat. No. 4,616,048 (column 8, row 5–10, and Table I column B) was added. Part B contained 11.1 wt. % octanol, 10.8 wt. % t-butyl peroxybenzoate, 28.7 wt. % H300, and 49.3 wt. % LUPERCO AA, which is 33 wt. % benzoyl peroxide on wheat starch. The amount of Part B was 10 wt. % based on the combined weights of Part A and Part B. Mixing continued until the peak torque was achieved. The minimum, maximum, and torque rise is reported in Table I. The sample was then allowed to cool to room temperature and a 1 g sample thereof was allowed to swell for 72 hours in cyclohexanone at room temperature. It was weighed swollen. The sample was then dried in a vacuum oven at 110° C. to constant weight. The ratio of the swollen weight to the dry weight was recorded as the Swell Ratio in Table II. The number average size of the benzoquinone dioxime particles in the "A" component are reported in Table III.

Examples 8–11

Vulcanization of Tire Sealant

The procedure of Example 7 was followed replacing the material of Example 1 with the material of Examples 3, 4, 5 and 6 respectively to generate Examples 8–11.

TABLE I

Plasticorder Torque Response During Sealant Vulcanization[1]

| Example Number | Minimum | Maximum | Rise[2] |
|---|---|---|---|
| 7 | 340 | 437 | 97 |
| 8 | 290 | 390 | 100 |
| 9 | 330 | 410 | 80 |
| 10 | 410 | 480 | 70 |
| 11 | 380 | 480 | 100 |

[1]Torque in meter-grams
[2]Difference between maximum and minimum torque values.

TABLE II

Solvent Swelling Behavior

| Example Number | Mixing Method | Swell Ratio | Solvent Clarity |
|---|---|---|---|
| 7 | Dry | 21.6 | Cloudy |
| 8 | Dry | 27.9 | Very Cloudy |
| 9 | Dry | 26.8 | Cloudy |
| 10 | Dry | 22.8 | Clear |
| 11 | Solution | 27.4 | Clear |

TABLE III

Benzoquinone Dioxime Particle Size Measured in Component "A"

| Example Number | Average Size | Maximum Size | Standard Deviation |
|---|---|---|---|
| 7 | 1.1 | 4.2 | 0.7 |
| 8 | 1.4 | 14.0 | 1.8 |

TABLE III-continued

Benzoquinone Dioxime Particle Size Measured in Component "A"

| Example Number | Average Size | Maximum Size | Standard Deviation |
|---|---|---|---|
| 9 | 2.4 | 13.2 | 2.5 |
| 10 | 1.3 | 5.5 | 1.0 |
| 11 | 7.7 | 44.8 | 6.0 |

Table I illustrates that the elimination of nonpolar solvents in examples 7–10 results in comparable extents of vulcanization without the expense attributed to inclusion of the hexane.

Table II illustrates that the amount of extractables can be controlled with or without hexane.

Table III illustrates that very small number average particle sizes are achieved with the method that does not use hexane to dissolve the high molecular weight elastomer. Example number 11 may have had larger particle size benzoquinone dioxime due to the fact that the benzoquinone dioxime solution is that example was not filtered.

While in accordance with the patent statutes the best mode and preferred embodiment have been set forth, the scope of the invention is not limited thereto, but rather by the scope of the attached claims.

What is claimed is:

1. A process for forming a dry sealant composition, comprising the steps of:
   a) adding at least one quinoid curing agent to a solubilizing organic polar solvent and forming a dissolved quinoid solution,
   b) adding said dissolved quinoid curing agent solution to a rubber blend during mixing of said rubber blend, and precipitating during mixing said curing agent in said blend so that a uniform fine dispersion of said curing agent is formed, and
   c) removing said polar solvent of said mixture to form the dry sealant component wherein the number average particle size of said dispersed quinoid curing agent is less than 10 microns, and wherein said rubber blend includes less than 10 wt % of nonpolar solvents when said quinoid curing agent is added.

2. A process according to claim 1 wherein said rubber blend contains at least one high molecular weight polymer, having a molecular weight at least about 50,000; and at least one low molecular weight liquid tackifier, with a molecular weight of about 500 to about 5000; and wherein the amount of said quinoid curing agent is up to a saturated amount in said organic polar solvent.

3. A process according to claim 2, wherein the amount of said quinoid is up to about 10 percent by weight based upon 100 parts by weight of said organic polar solvent.

4. A process according to claim 2, wherein the amount of said quinoid is from about 0.2 to about 2.0 parts by weight per 100 parts by weight of said dry sealant component, and wherein the number average particle size of said dispersed quinoid curing agent is less than 5 microns.

5. A process according to claim 4, wherein the amount of said high molecular weight rubber polymer is from about 10 percent to about 45 percent by weight, and wherein the amount of said low molecular weight liquid tackifier is from about 55 percent to about 90 percent by weight of said blend of high molecular weight rubber and low molecular weight liquid tackifier.

6. A process according to claim 5, wherein said high molecular weight polymer is selected from the group consisting of EPDM, polybutadiene, butyl rubber, halo butyl rubber, acrylonitrile-butadiene copolymer, styrene-butadiene copolymer, natural rubber, cis polyisoprene, and combinations thereof, wherein said liquid tackifier has a number average molecular weight of from about 500 to about 5,000.

7. A process according to claim 6, wherein the amount of said quinoid curing agent is from about 0.3 to about 1.0 parts by weight, and including a step of adding a nonionic or an anionic surfactant to either said solubilized quinoid curing agent or said rubber blend, the amount of said surfactant agent being from about 0.001 to about 2.0 percent by weight based upon said dry sealant component.

8. A process according to claim 7, wherein said organic polar solvent comprises tetrahydrofuran, cyclohexanone, furan, dioxane, dioxolane, dimethylsulfoxide, dimethylformamide, ethanol, isopropanol, acetone, or methylethyl ketone.

9. A process according to claim 4, wherein said polar organic solvent comprises tetrahydrofuran.

10. A process according to claim 1, including adding a cocurative peroxide component dispersed in a rubber to said dry sealant component to form the sealant composition, said peroxide component containing an organic peroxide in an amount from about 0.5 to about 10.0 mole per mole of said quinoid curing agent, said peroxide component optionally containing from about 0.1 to about 20 parts by weight of a polar solvent accelerator based upon 100 parts by weight of said peroxide component, and wherein said organic peroxide, if a solid at the mixing temperature, has an average particle size of less than 15 microns.

11. A process according to claim 4, including adding a cocurative peroxide component dispersed in a rubber to said dry sealant component to form the sealant composition, said peroxide component containing an organic peroxide in an amount from about 0.5 to about 10.0 mole per mole of said quinoid curing agent, and said peroxide component optionally containing from about 0.1 to about 20 parts by weight of a polar solvent accelerator based upon 100 parts by weight of said peroxide component.

12. A process according to claim 6, including adding a cocurative peroxide component dispersed in a rubber to said dry sealant component to form the sealant composition, said peroxide component containing an organic peroxide in an amount form about 0.5 to about 10.0 mole per mole of said quinoid curing agent, said peroxide component optionally containing from about 0.1 to about 20 parts by weight of a polar solvent accelerator based upon 100 parts by weight of said peroxide component.

13. A process according to claim 10, wherein the amount of said organic peroxide is from about 1.0 to about 5.0 moles per mole of said quinoid curing agent, wherein the amount of said optional polar solvent accelerator is from about 0.5 to about 15 parts by weight based upon 100 parts by weight of said peroxide component, wherein said organic peroxide has an average particle size of less than 5 microns, and including curing said sealant composition at a temperature of from about 15° C. to about 150° C.

14. A process according to claim 11, including curing said sealant composition at a temperature of from about 15° C. to about 150° C.

15. A process according to claim 2, wherein said polar organic solvent comprises tetrahydrofuran.

16. A process according to claim 10, including a step of applying said dry sealant to an inner surface of a pneumatic tire opposite the tread region.

17. A process according to claim 16, including a step of partially or fully curing said dry sealant composition at a temperature from about 15° C. to about 150° C.

18. A process according to claim 2, wherein said rubber blend includes less than 5 wt. % nonpolar solvents when said quinoid curing agent is added.

19. A process according to claim 2, wherein said rubber blend includes less than 1 wt. % nonpolar solvents when said quinoid curing agent is added.

20. A process according to claim 2, wherein said rubber blend includes less than 0.1 wt. % nonpolar solvents when said quinoid curing agent is added.

21. A product made by the process of claim 2.

22. A process for forming a dry sealant composition comprising the steps of:

a) adding at least one quinoid curing agent to a solubilizing organic polar solvent comprising tetrahydrofuran and forming a dissolved quinoid solution, b) adding said dissolved quinoid curing agent solution to a rubber blend comprising from about 10 to about 45 weight percent of a high molecular weight rubber and from about 55 to about 99 weight percent of a low molecular weight rubber based up the weight of the blend of said low and high molecular weight rubbers, and mixing and precipitating during mixing said curing agent in said blend so that a uniform fine dispersion of said curing agent is formed, and c) removing said polar solvent of said mixture to form the dry sealant component wherein the amount of said quinoid curing agent is from about 0.2 to about 2 parts by weight per 100 parts by weight of said dry sealant, the number average particle size of said dispersed quinoid curing agent is less than 5 microns, and wherein said rubber blend includes less than 5 wt. % of nonpolar solvents when said quinoid curing agent is added.

* * * * *